March 22, 1938.    F. C. BEST    2,112,133
MOTOR VEHICLE
Filed May 27, 1935    3 Sheets-Sheet 1

Inventor
FRANK C. BEST
By Tibbetts and Hart
Attorneys

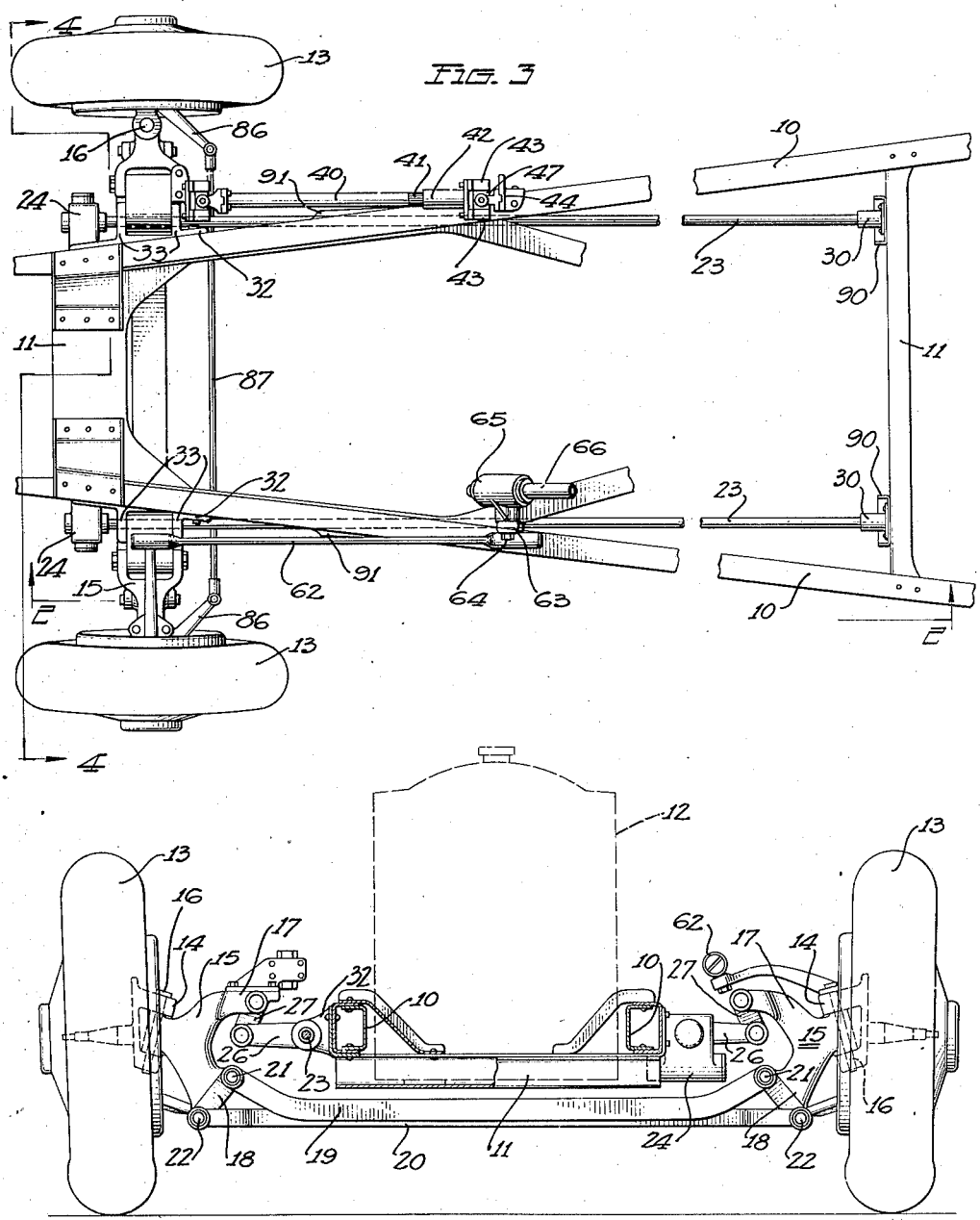

March 22, 1938.  F. C. BEST  2,112,133
MOTOR VEHICLE
Filed May 27, 1935   3 Sheets-Sheet 3
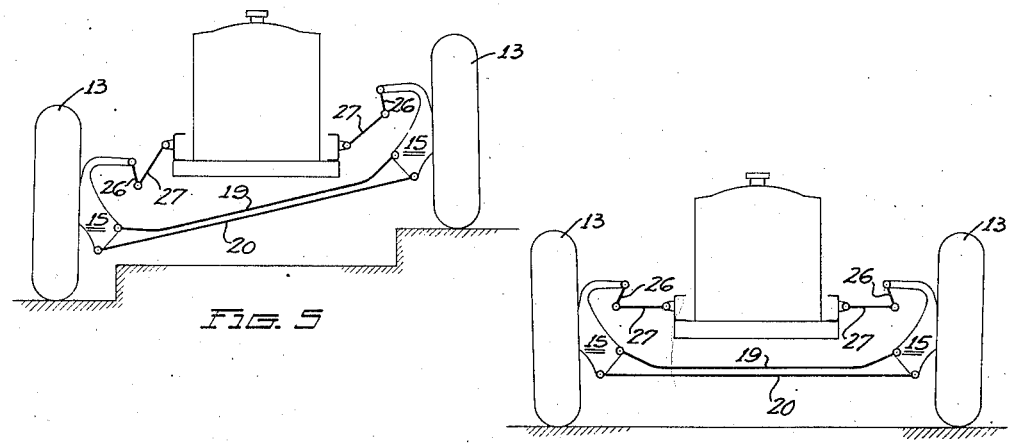
Fig. 5
Fig. 8
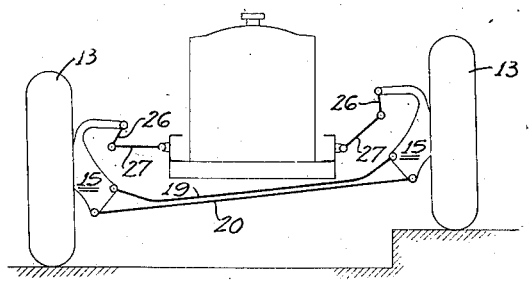
Fig. 6
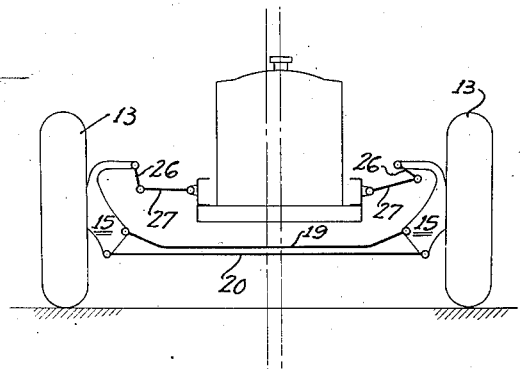
Fig. 9
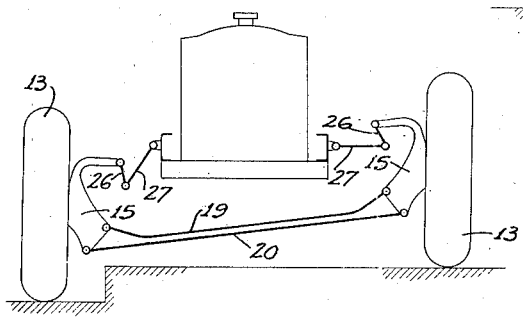
Fig. 7
Inventor
FRANK C. BEST
By Tibbetts and Hart
Attorneys Patented Mar. 22, 1938

2,112,133

UNITED STATES PATENT OFFICE 2,112,133

MOTOR VEHICLE

Frank C. Best, Detroit, Mich., assignor to Packard Motor Car Company, Detroit, Mich., a corporation of Michigan Application May 27, 1935, Serial No. 23,615

14 Claims. (Cl. 267—57)

This invention relates to road vehicles and more particularly to steering wheel mountings.

There are many undesirable effects caused by the conventional wheel mountings now employed with motor driven road vehicles. Among these undesirable effects are body side-sway when rounding curves, small variation in the spring rate of the suspension, frame stresses and front end disturbances, tire wear, skidding and steering effort.

It is an object of this invention to eliminate or reduce all of the above listed undesirable conditions in road vehicles through an improved form of wheel mounting and suspension system.

Another object of the invention is to eliminate vehicle body side-sway through mechanism associated directly with the front wheel mounting structure.

A further object of the invention is to provide a wheel mounting mechanism in which the number of parts connecting the shock absorber with the suspension is reduced over that in conventional structures.

A still further object of the invention is to provide motor vehicle wheel mounting structures which function to maintain substantially no variance in wheel caster, camber, and toe-in when the wheels are rising or falling.

Other objects of the invention will appear from the following description taken in connection with the drawings, which form a part of this specification, and in which:

Fig. 3 is a plan view of the forward end of a motor vehicle incorporating the invention.

Fig. 4 is a sectional view of the vehicle taken on line 4—4 of Fig. 3.

Fig. 5 is a diagrammatic view looking at the front of the vehicle with one wheel above and the other wheel below the normal road level.

Fig. 6 is a similar diagrammatic view with one of the wheels in elevated relation.

Fig. 7 is a similar diagrammatic view of one of the wheels below the normal road level.

Fig. 8 is a similar diagrammatic view showing both front wheels on a normally level road surface.

Fig. 9 is a similar diagrammatic view showing the position of the frame and the wheel suspension when the vehicle is rounding a curve.

Figure 1:
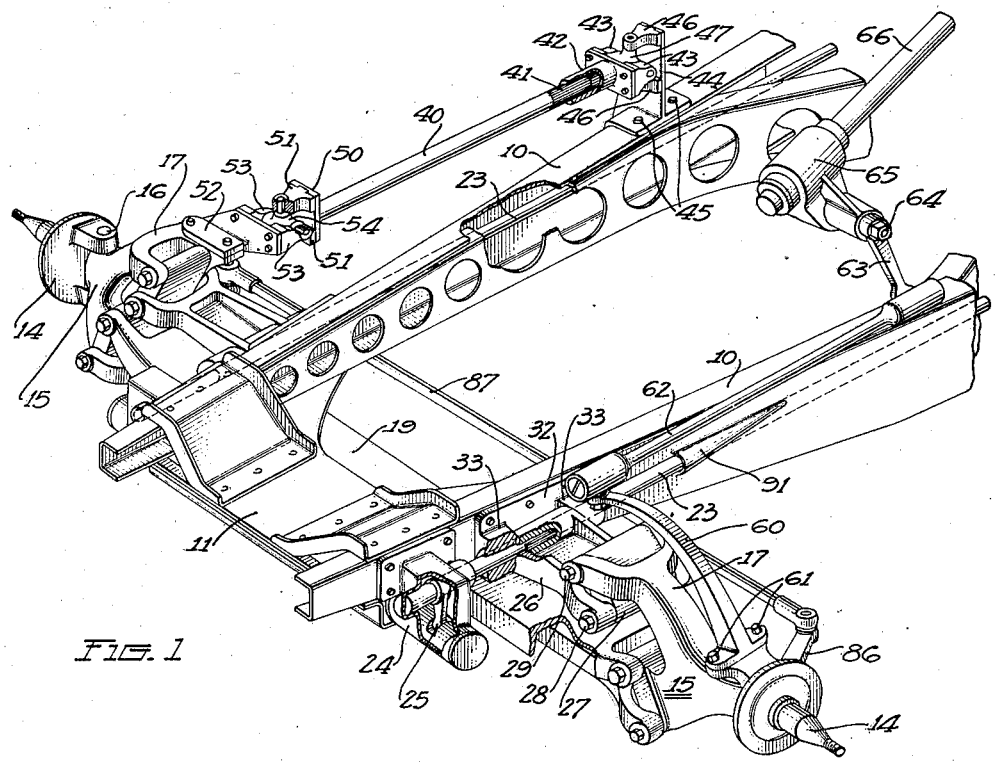
Fig. 1 is a perspective view of the forward end of a motor vehicle chassis incorporating my invention, parts being broken away and in section.
Figure 2:
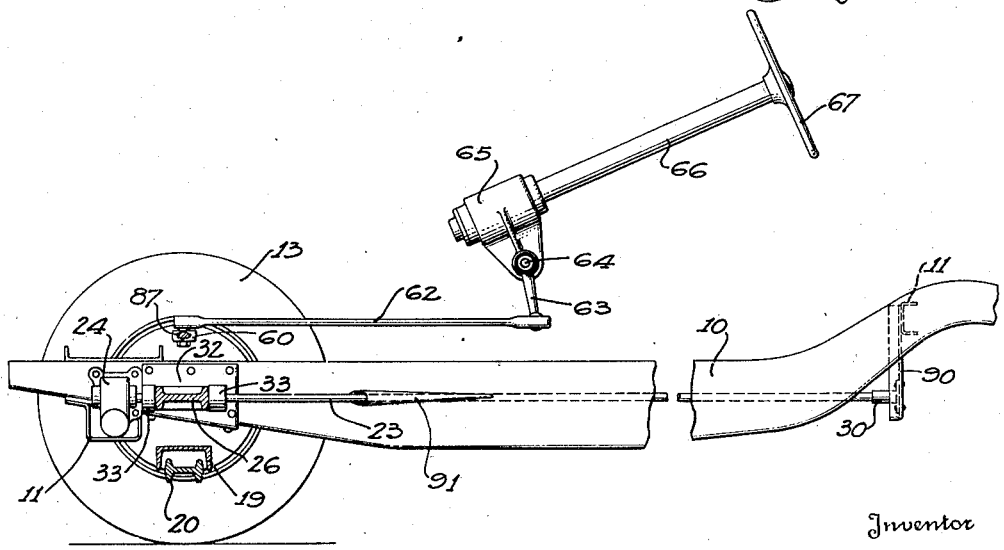
Fig. 2 is a sectional view of the same taken on line 2—2 of Fig. 3.

Referring now to the drawings by characters of reference, the forward end of the motor vehicle frame is shown as consisting of side sills 10 and cross brace members 11. The side sills are preferably box-shaped in section at their forward end and the forward brace member 11 is a built up structure of conventional design. On the forward end of the frame is arranged a conventional radiator 12, as shown in dotted lines in Fig. 4. The frame is carried by wheels arranged on opposite sides and at the ends thereof, only the forward steering wheels 13 being shown in the drawings.

Between the front steering wheels and the frame or load carrying means is a mounting and suspension system incorporating the present invention.

Each wheel is mounted on a suitable axle structure 14, each of which is pivotally connected to a carrier 15 by a suitable king pin structure 16. The inwardly extending portion of each carrier terminates in an upper bifurcated arm 17 and a lower arm 18. These carriers are connected together by a pair of substantially parallel links 19 and 20. The upper link 19 is shorter than the lower link 20 and is of channel form and partially telescopes a portion of the lower link. This upper link is curved upwardly at its ends and such ends are pivotally secured to the lower carrier arms 18 by pins 21. The lower link 20 extends substantially in a horizontal plane transversely of the vehicle and is pivotally connected to the carrier arms 18 by pins 22.

The arms 17 of the carriers are suspended from the main frame by individual mechanism so that they can rise and fall independently. Each mechanism has a torsionally yieldable rod 23 fixedly secured at its rear end and rotatably mounted at its forward end in a shock absorber housing 24 fixed to the adjacent side sill 10 of the frame. In each shock absorber housing is a movable element for resisting torsional movement of the associated spring rod and in the present instance it takes the form of a piston, the shock absorber illustrated being of the conventional hydraulic type. Fixed on each spring rod 23 is an arm 26 projecting outwardly in a transverse direction from the frame and the outer end of each arm is connected with the bifurcated end of the adjacent carrier arm 15 by a link 27. Pivot means is associated with each arm to fasten the associated link thereto, and with the arm 26 to fasten the associated link thereto, and pivot means 29 is associated with each carrier to mount the associated link 27 therewith.

The rear ends of the spring rods 23 are fixed in brackets 30 carried by supports 90 depending from and fixed to a rearwardly located rear cross member 11. The spring rods 23 are keyed to their associated shock absorber pistons 25, but they have an axially sliding fit therewith in order to allow for lengthwise distortion when in torsion. On the side of each sill 10 is fixed a bracket 32 having bearings 33 through which the spring rods 23 extend and serving as a support therefor adjacent each end of the arm 26. It will be noted that the shock absorbers are located in a relation with the frame so that the pistons 25 can move in a direction transversely of the frame, the purpose of which will be set forth hereinafter. As the frame converges toward the front end, openings are formed therein through which the spring rods 23 extend and at such points the frame serves as a bearing 91 for the rods.

Stabilizer means connects one of the wheel carriers 15 with the vehicle frame to prevent side tilting of the frame relative to the road surfaces when the vehicle is rounding turns in the road. Such stabilizer mechanism consists of a rod 40 which is pivotally connected at one end with a frame side sill and at the other end with one of the wheel carriers. The rear end of such rod is formed with splines 41 for engagement with the bracket member 42, having arms 43 extending rearwardly therefrom. Another bracket 44 extends upwardly from the side sill and is fixed thereto by suitable fastening means 45. From this bracket 44 extend arms 46 and pivotally connected with the arms 43 and 46 is a universal coupling member 47. The forward end of the rod 40 is fixed to a bracket 50 carrying forwardly extending arms 51 and fixed on the upper face of one of the bifurcated ends of the carrier arm 17 is a bracket 52 having forwardly extending arms 53. A universal coupling 54 is provided to connect the arms 51 and 53.

A steering arm 60 is secured by studs 61 to the left axle member 14, and connected with such arm in the usual manner is a drag link 62 with which an operating arm 63 is connected. This operating arm is actuated by conventional steering mechanism consisting of a shaft 64 and gearing within a housing 65 which is manually or otherwise operated by a control shaft extending through a column 66 and having on its end a hand wheel 67. Arms 86 are fixed to the axle means 14 and a tie rod 87 connects such arms to move the wheel simultaneously when the steering gear is actuated.

The rise or fall of a wheel below its normal position on a level road bed is resisted by the force exerted by the spring rods 23 in resisting torsional movement thereof. Such torsional movement is transmitted through the carriers 15 and the links 27 to the arms 26 fixed on the rods. In addition to this resilient torsional resistance of the rods, rise and fall of the wheels is resisted by the shock absorber structures associated therewith.

As the wheel carriers 15 are connected together by transverse parallel links 19 and 20 they must move in parallel relation. The link 19 being shorter than the link 20 serves to restrain the normal arcuate path which would be traversed by the wheel carriers in their rising and falling movement and hence this arrangement of transverse links maintains the caster, camber and toe-in of the wheels in a minimum arcuate range of movement. Such control of the wheels while rising and falling assists in maintaining steering geometry as well as reducing the wear and tear on tires which would normally occur if a more arcuate path were taken by the wheels in their rising and falling movement.

Through the arrangement of the shock absorbers, wherein the pistons move in a path transversely of the frame, and the association therewith of torsion spring rods lateral bending and torsion in the vehicle frame is substantially eliminated. With the form of suspension herein described, there will be no spring action wherein the axle means or mounting will overcome the spring resistance sufficiently to contact the frame. In addition, this form of suspension has a variable springing rate which is low for boulevard riding and high from a standpoint of stability on the highway. This range in spring rate is due to the short lever arm and shackle connection with the carrier connected with the end of the torsion rod springs remote from their point of connection with the frame. The wheel mountings are independently suspended but restrained in their movement transversely of the vehicle so that the wheels rise and fall substantially in a vertical line. The stabilizer means prevents body sway or side tilting of the frame relative to the road surface when the vehicle is travelling around a turn in the road.

Figs. 5 to 9 inclusive of the drawings illustrate diagrammatically the relation of the front wheels, their mounting and the frame under the various conditions encountered during operation of a vehicle. In Fig. 8 such structures are in a normal position, that is, when the wheels engage a level road and the travel is in a straight direction.

The disposition of the above mentioned elements when the vehicle is travelling on a curved road is shown in Fig. 9. It will be noted that the vehicle frame is level with the ground and that the frame is shifted sidewise to some extent. The parallel links 19 and 20 cause the wheel carriers 15 to move together in a parallel relation and the stabilizer means connecting one of the wheel carriers with the frame prevents side tilting of the frame relative to the carriers. As a result the forces shift the frame sidewise to some extent without tilting through shifting of links 26 and arms 27.

In Figs. 5, 6, and 7 the vehicle is encountering a rise, depression or both in the road. Under any of such conditions the parallel links 19 and 20 maintain the carriers 15 in a parallel relation substantially the same as when the wheels rest on a level road, the vertical positions however of course varying. Under such circumstances the links 27 and the arms 26 pivot to change their angular relation but the frame remains in the same relation as when the wheels are on a level road. Under such circumstances the stabilizer means prevents tilting of the frame.

It will thus be seen that the passengers of a vehicle equipped with wheel mounting of the character herein described will have a comfortable ride because there will be substantially no sidewise pitching, minimum vibration from frame and wheel shake, and a suspension rate which gives a comfortable ride on highways or boulevards. The structure also serves to increase the tire life and also that of the other elements associated with the forward end of the frame.

Although the invention has been described in connection with a specific embodiment, the principles involved are susceptible of numerous other applications which will readily occur to persons skilled in the art. The invention is therefore to be limited only as indicated by the scope of the appended claims.

What I claim is:

1. In a vehicle having a frame and a road wheel, connecting mechanism comprising a torsionally yieldable rod extending longitudinally of the frame and fixed at its rear end thereto, a fluid shock absorber housing fixed to said frame and supporting the forward end of said rod, a piston element in the housing movable in a direction transversely of the frame, means fixing said movable element to said rod, an arm fixed on said rod, a wheel carrier adjacent said arm, and a link connecting said carrier with said arm.

2. In a vehicle having a frame and oppositely disposed road wheels adjacent each side thereof, of mechanism coupling said wheels with the frame comprising a pair of torsionally yieldable rods extending longitudinally of the frame adjacent each side thereof, means fixing the rear ends of said rods to said frame, a wheel carrier adjacent the forward end of each rod on each of which an axle is pivotally mounted, an arm fixed on each rod, a link inclined to the vertical connecting each carrier with the arm on the adjacent rod, stabilizer means connecting one carrier with the frame and transversely extending links pivotally connecting said carriers and freely movable therewith.

3. In a vehicle having a frame and oppositely disposed road wheels adjacent each side thereof, wheel mounting mechanism comprising wheel carriers, individual suspension means for the carriers, stabilizer means connecting one of the carriers with the frame and a pair of transversely extending links pivotally connecting said carriers, said links being of different length and freely movable except for their said pivotal connections.

4. In a vehicle having a frame and oppositely disposed road wheels adjacent each side thereof, wheel mounting mechanism comprising a wheel carrier at each side of the vehicle, a torsionally yieldable rod extending longitudinally along each side of the frame and fixed at the rear end, an arm fixed on each rod extending in a direction transversely of the vehicle, a link inclined slightly to the vertical connecting each carrier with the adjacent arm, stabilizer means connecting one carrier with the frame, and parallel links connecting the carriers, said links being pivoted to and freely movable with said carriers.

5. In a vehicle, the combination of a frame, oppositely disposed wheel carriers independently mounted on the frame, parallel transversely extending links connecting said carriers, and stabilizer means connecting one of said carriers with said frame.

6. In a vehicle, the combination of a frame, oppositely disposed wheel carriers independently sprung from said frame, parallel transverse links connecting said carriers, a longitudinally extending stabilizer rod, and universal joints connecting said rod with one of said carriers and said frame.

7. In a vehicle, the combination of a frame, oppositely disposed wheel carriers, a separate suspension means connecting each carrier with said frame, parallel links connecting said carriers, and stabilizer means connecting said frame and one of said wheel carriers.

8. In a vehicle, a frame, oppositely disposed road wheels, an axle for each wheel, a carrier for pivotally carrying each wheel, parallel links of different length connecting said carriers, longitudinally extending torsionally yieldable rods fastened one at each side of said frame, an arm fixed on each rod adjacent said carriers, link means connecting the adjacent arms and carriers, and stabilizer means connecting one of said carriers with the frame, said stabilizer means including a longitudinally extending rod connected by universal joints at each end with the carrier and the frame.

9. In a vehicle, the combination of a load supporting means, oppositely disposed wheel carriers independently sprung from said frame, connecting means between said carriers for maintaining them in substantially parallel relation, and connecting means between one of said carriers and said frame for maintaining a substantially parallel relation thereof.

10. In a vehicle, the combination of a frame, oppositely disposed wheel carriers mounted independently on the frame, parallel links extending transversely of the frame and pivoted at their ends to the carriers, said links being freely movable with said carriers, and body stabilizer means connecting one of the carriers with the frame.

11. In a vehicle, the combination of a frame, oppositely disposed wheel carriers on each side of said frame and mounted independently on the frame, a pair of superposed parallel links extending transversely of the frame and pivoted at the ends to said carriers, the lower link projecting beyond the ends of the upper link, and body stabilizer means connecting one of the carriers with the body.

12. In a vehicle, the combination of a frame, oppositely disposed wheel carriers independently mounted on said frame, means interconnecting the carriers to maintain them in substantially parallel relation, and a body stabilizer rod connected with the frame and one of the carriers.

13. In a vehicle, the combination of a frame, a pair of wheel carriers disposed on opposite sides of said frame, transversely extending link means connecting said carriers, suspension means associated with each side of the frame, a link connecting each suspension means with a carrier, said links when in normal vehicle position extending at an angle to vertical, with their lower ends outermost, and stabilizer means connecting one of the carriers with the frame.

14. In a vehicle, the combination of a frame, a pair of wheel carriers disposed on opposite sides of said frame, transversely extending link means connecting said carriers, suspension means associated with each side of the frame, including an outwardly extending arm, said carriers having a portion overlying the adjacent arm, a link connecting the outer end of each arm with the overlying end portion of the adjacent carrier, said links when in normal position having their lower ends outermost, and stabilizer means connecting one of the carriers with the frame.

FRANK C. BEST.